United States Patent
Park

[11] Patent Number: 5,883,749
[45] Date of Patent: Mar. 16, 1999

[54] TECHNIQUE FOR INITIALIZING HARD DISK DRIVE

[75] Inventor: Sung-Yeoul Park, Seoul, Rep. of Korea

[73] Assignee: SamSung Electronics Co., Ltd., Suwon, Rep. of Korea

[21] Appl. No.: 746,297

[22] Filed: Nov. 7, 1996

[30] Foreign Application Priority Data

Nov. 7, 1995 [KR] Rep. of Korea .................. 40090/1995

[51] Int. Cl.[6] .............................................. G11B 21/02
[52] U.S. Cl. .......................................... 360/75; 360/78.04
[58] Field of Search ................................. 360/75, 78.04, 360/69; 369/44.27, 54; 364/571.01

[56] References Cited

U.S. PATENT DOCUMENTS

| | | | |
|---|---|---|---|
| 4,499,510 | 2/1985 | Harding et al. | 360/77.02 |
| 4,907,109 | 3/1990 | Senio | 360/78.04 |
| 4,969,059 | 11/1990 | Volz et al. | 360/78.04 |
| 4,982,296 | 1/1991 | Brown et al. | 360/77.03 |
| 5,132,855 | 7/1992 | Waugh et al. | 360/78.07 |
| 5,227,930 | 7/1993 | Thanos et al. | 360/78.04 |
| 5,276,569 | 1/1994 | Even | 360/73.02 |
| 5,305,160 | 4/1994 | Funches et al. | 360/78.07 |
| 5,329,409 | 7/1994 | Hampshire | 360/77.02 |
| 5,473,230 | 12/1995 | Dunn et al. | 360/73.03 X |
| 5,473,550 | 12/1995 | Cameron et al. | 360/77.09 X |
| 5,488,274 | 1/1996 | Satoh | 318/101 |
| 5,500,776 | 3/1996 | Smith | 360/77.04 |
| 5,638,230 | 6/1997 | Kadlec | 360/78.09 X |
| 5,659,438 | 8/1997 | Sasamoto et al. | 360/78.04 X |

*Primary Examiner*—Andrew L. Sniezek

[57] ABSTRACT

An hard disk drive (a HDD) initialization technique, for performing compensation for an offset value of an IC (integrated circuit) of a PCB (printed circuit board), generated in associated circuits or apparatus, to stably initialize a head by calibrating an initial offset value to calibrate an integrated circuit offset value of a printed circuit board upon the power being applied; unlatching a head by using the circuit offset value; performing a full track seek for a given time period and calibrating a first torque constant as a self diagnosis function of an actuator; calibrating a bias value from servo information detected during the track seek; and performing the full track seek after calibration of the bias value and calibrating a second final torque constant so as to calibrate the torque constant of the actuator.

9 Claims, 4 Drawing Sheets

TECHNIQUE FOR INITIALIZING HARD DISK DRIVE

CLAIM OF PRIORITY

This application makes claims all benefits accruing under 35 U.S.C. §119 from an application for INITIALIZATION METHOD PERFORMED BY SELF TUNING IN HARD DISK DRIVE earlier filed in the Korean Industrial Property Office on the 7th day of Nov. 1995 and there duly assigned Serial No. 40090/1995.

BACKGROUND OF THE INVENTION

1. Field of the Invention

The present invention relates to hard disk drive (hereinafter, sometimes referred to as an HDD) generally and, in particular, to a circuit and technique for initializing the hard disk drive, and for compensating for an offset value generated in associated circuits or apparatus.

2. Description of the Related Art

Normally, in a servo control of an hard disk drive, a series of steps for initializing the hard disk drive have fatal influence on the performance of the hard disk drive. In respect to earlier hard disk drive initialization techniques, the initialization steps performed from when a head is unlatched from a parking area and moved to a data area whenever the power is applied is explained hereinafter.

Most of all, when the power is applied to the hard disk drive, at step 1, track seek and track following operations are performed for a given time period to move the head from the parking area to a specific cylinder. Hereinabove, the specific cylinder is defined to be the cylinder where an initial head is positioned on the surface of a disk to prepare for the unlatching of the head of the hard disk drive and its movement from the parking area to the data area. A control input value is produced from a position error signal (hereinafter, sometimes referred to as a PES) obtained upon the track following operation to be stored as a bias value of a first cylinder for bias calibration in a bias table. Herein, the control input value is indicative of a signal applied to a driving unit of an actuator for driving the head in a horizontal direction on the surface of the disk, that is, a voice coil motor (hereinafter, sometimes referred to as a VCM).

At step 2 following step 1, the track seek and the track following operations are performed by using the bias value generated in step 1, to thereby move the head to a second cylinder and the control input value is produced from the position error signal obtained upon the track following, the produced control input value being stored as the bias value of the second cylinder for the bias calibration in the bias table. After storing the bias values calibrated through the methods of steps 1 and 2, for example, in the bias table, a full track seek operation is performed to calibrate a torque constant Kt value as a self diagnosis function of a voice coil motor used as an actuator, thereby completing the initialization of the head in the stand-by state of the hard disk drive.

There are several disadvantages however, in performing the initialization technique of the hard disk drive as noted above. Firstly, upon track seek and track following operations of step 1, inasmuch as the head is in the off-track upon completing the track seek operation in a track seek routine due to the offset value included in an IC (integrated circuit) of a printed circuit board (hereinafter, referred to as a PCB), for example, a digital-to analog converter (hereinafter, referred to as a D/A converter), an integrator can not be operated. Also, in this case, a slip phenomenon can be generated due to off-track upon the track following operation.

Secondly, the bias value obtained by the slip phenomenon is not exact and further, has an effect on the track seek and track following operations to the corresponding track for the continuous bias calibration, so that the normal table value can not be obtained.

Thirdly, for utilizing the initial value for torque constant Kt calibration, since the initial value has each offset value for each head disk assembly, the initial torque constant Kt has an exceedingly great influence upon the bias calibration, thereby having the possibility of generating an oscillation phenomenon. In other words, there are the foregoing problems generated due to characteristic differences for each drive in the above-noted hard disk drive initialization technique.

The following references, while bearing features in common with the present invention, nevertheless do not teach or suggest the specifically recited hard disk drive initialization technique of the present invention: U.S. Pat. No. 5,500,776 to Smith, entitled Self-Calibration For Computer Disk Read/Write Offsets, U.S. Pat. No. 5,488,274 to Satoh, entitled Method For Controlling Activation Of Disk Drive Motors, U.S. Pat. No. 5,329,409 to Hampshire, entitled Correction Of Current Feedback Offset For Disc Drive Servo Systems, U.S. Pat. No. 5,305,160 to Funches et al., entitled Compensating For Variations In Torque Capability Of Voice Coil Motors, U.S. Pat. No. 5,276,569 to Even, entitled Spindle Controller With Startup Correction Of Disk Position, U.S. Pat. No. 5,227,930 to Thanos et al., entitled Head Position Recalibration For Disk Drive, U.S. Pat. No. 4,499,510 to Harding et al., entitled Precision Alignment System For Information Storage Devices, U.S. Pat. No. 4,969,059 to Voltz et al., entitled Offset Nulling System For Computer Disk Drives, and U.S. Pat. No. 4,907,109 to Seniio, entitled Magnetic Disc Drive System Having Automatic Offset And Gain Adjustment Means.

SUMMARY OF THE INVENTION

It is therefore an object of the present invention to provide an improved hard disk drive.

It is another object to provide an hard disk drive initialization circuit and technique able to compensate for offset values of integrated circuits on a printed circuit board.

It is still another object to provide an hard disk drive initialization circuit and technique for compensating for offset values generated by associated circuits and apparatus.

It is yet another object to provide an initialization circuit and technique able to assure stable initialization of a head positioned to read and write data onto the media of a moving memory media.

These and other objects can be achieved according to the principles of the present invention with an initialization circuit and process for a memory of a hard disk drive by calibrating an initial offset value to establish an integrated circuit offset value for a printed circuit board upon application of electrical power to the printed circuit board, and unlatching a head positioned to read data from and write data on a moving media held by the memory by using said offset value. After unlatching the head, a full track seek is performed for a given time after unlatching the head and a first torque constant is established as a self diagnosis function for the actuator supporting the head, and a bias value is derived from servo information detected during the track seek. The full track seek is continued after the bias value is established and a second torque constant is established to enable calibration of the torque constant of the actuator.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENT

Figure 1:
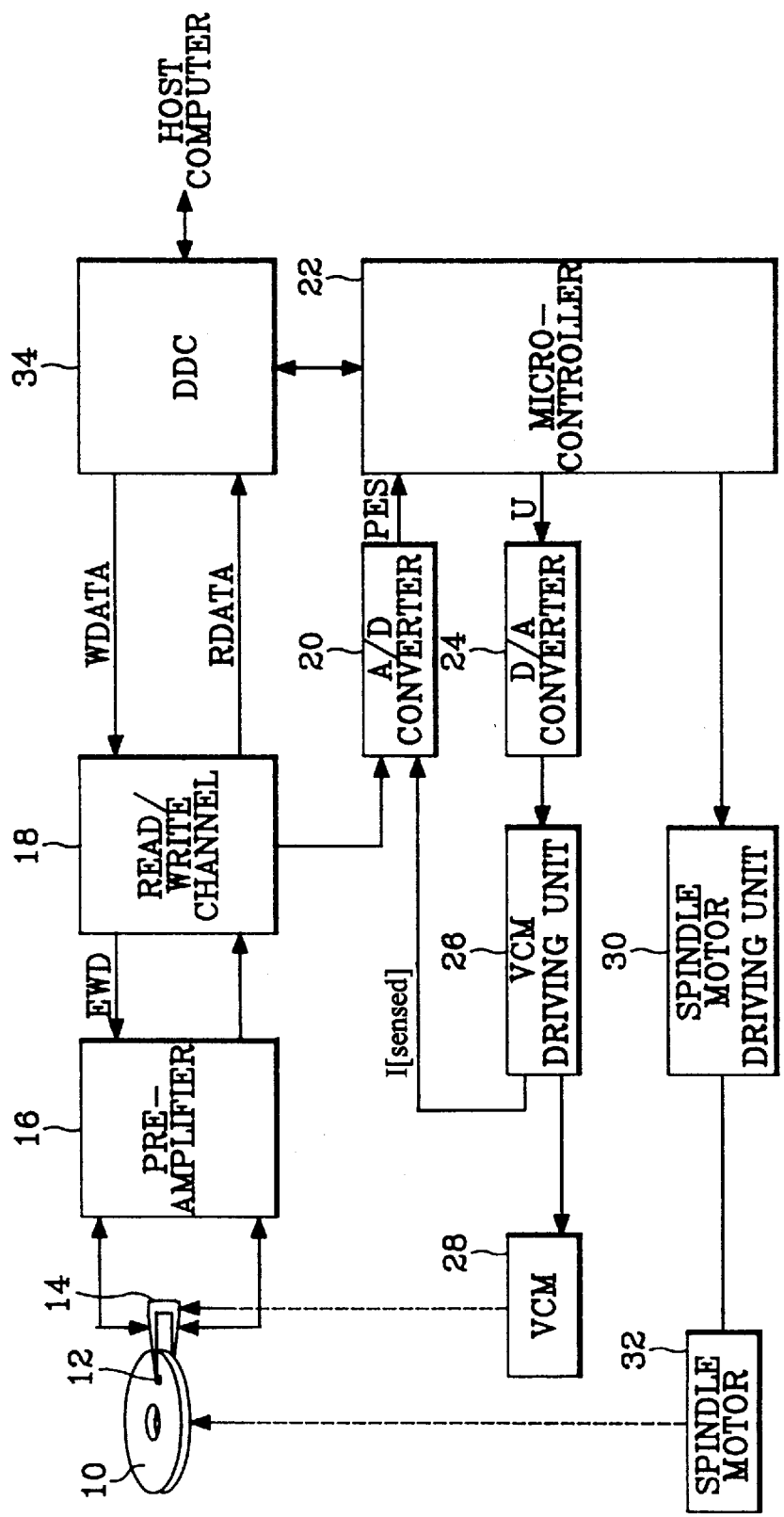
FIG. 1 is a block diagram showing the construction of the hard disk drive constructed as an embodiment of the present invention.

Now, a preferred embodiment of the present invention will be described in detail with reference to the accompanying drawings. Throughout the drawings, it is noted that the same reference numerals or letters will be used to designate like or equivalent elements having the same function. In the following description, numerous specific details, such as components composing a concrete circuit and expressions, are set forth to provide a more thorough understanding of the present invention. It will be apparent however, to one skilled in the art that the invention may be practiced without these specific details. A detailed description of known functions and constructions unnecessarily obscuring the subject matter of the present invention have been omitted for clarity.

FIG. 1 is a block diagram showing the construction of the hard disk drive constructed according to the principles of the present invention. A hard disk drive constructed with a moving magnetic medium 10 is rotated to be mounted on a driving shaft of a spindle motor 32, and a magnetic head 12 is positioned on a surface of the magnetic disk 10 and installed on an extended arm 14 of an arm assembly of a voice coil motor 28. During the read operation of data, a pre-amplifier 16 pre-amplifies a signal picked up by the magnetic head 12, and during the write operation of data, enables encoded write data (hereinafter, sometimes referred to as EWD) supplied from a read/write channel 18, to be written on the surface of the magnetic disk 10 through the driving of the magnetic head 12. The read/write channel 18 which is connected to the pre-amplifier 16, an analog-digital converter 20 (hereinafter, referred to as an A/D converter), and a disk data controller 34 (hereinafter, referred to as a DDC), detect an amplified peak value of the signal pre-amplified in the preamplifier 16, and generate a data pulse. After that, the read/write channel 18 supplies decoded and encoded read data (hereinafter, referred to as RDATA) to the disk data controller 34, encodes written data (hereinafter, referred to as WDATA) provided from the disk data controller 34 and then supplies the encoded data encoded write data to the pre-amplifier 16. Further, the read/write channel 18 detects a servo signal of an analog format from the signal amplified in the pre-amplifier 16 and supplies the detected signal to the analog-to-digital converter 20. The analog-to-digital converter 20, connected to the read/write channel 18, receives an input of an analog servo reading signal, converts the inputted signal into position error signal digital data, and outputs the converted data to a micro-controller 22. Also, the analog-to-digital converter 20 senses the output current I (sensed) of the voice coil motor driving unit 26 for controlling the driving of the voice coil motor 28, converts the sensed current into a digital value, and supplies the converted current digital value to the micro-controller 22.

Meanwhile, the micro-controller 22 is connected to the disk data controller 34 and controls track seek and track following operations. The micro-controller 22 controls the aforementioned track following operation by using the position error signal value supplied from the ADC 20. The digital-to-analog converter (hereinafter, sometimes referred to as a D/A converter) 24 receives an input of a digital control output signal U generated by the micro-controller 22, converts the received signal into analog data, and finally outputs the converted data to the voice coil motor driving unit 26. The voice coil motor driving unit 26 is connected to the voice coil motor 28 and the digital-to-analog converter 24 and controls the driving of the voice coil motor 28 under the control of the micro-controller 22. The voice coil motor 28 moves the head 12 on the surface of the magnetic disk in correspondence with the direction and level of the driving current supplied from the voice coil motor driving unit 26. The spindle motor driving unit 30 controls the driving of the spindle motor 32 under the control of the micro-controller 32 and the spindle motor 32 enables the magnetic disk 10 to be rotated by the control of the spindle motor driving unit 30. The disk data controller 34 transmits the data received from the host computer through the read/write channel 18 to the surface of the magnetic disk 10, in response to the data read/write command received from the host computer or, transmits the data read from the magnetic disk 10 to the host computer. Additionally, disk data controller 34 interfaces the servo control of the micro-controller 22 in reply to the data read/write command received from the host computer.

Figure 2:
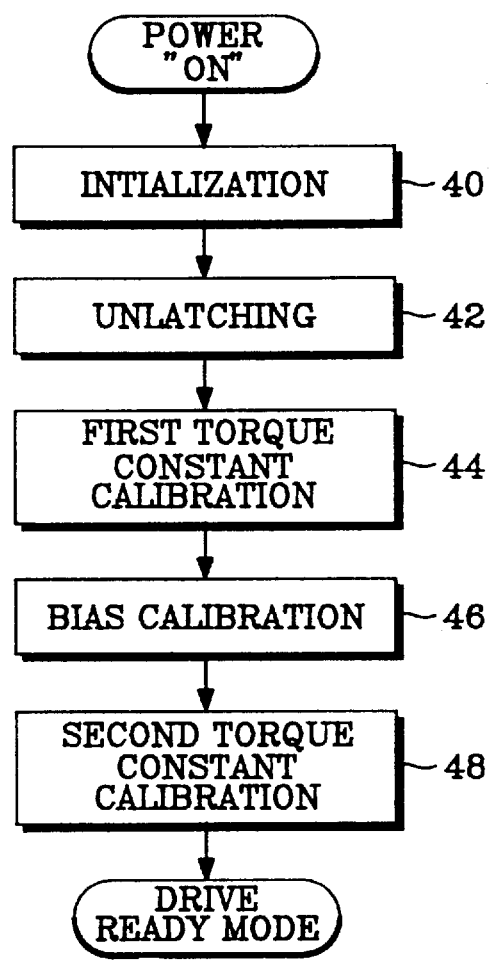
FIG. 2 is a flowchart showing the steps of initializing the hard disk drive constructed as an embodiment of the present invention.
Figure 3:
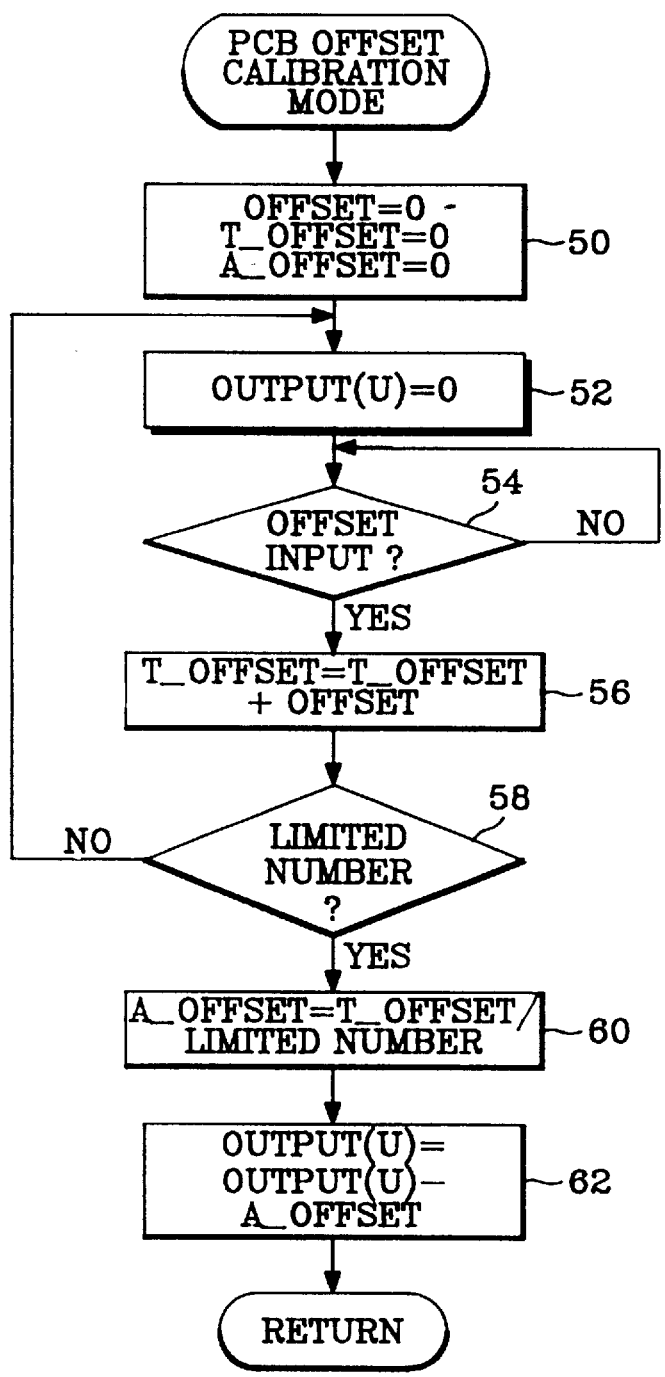
FIG. 3 is a flowchart showing the steps followed in the practice of the instant invention when producing an integrated circuit offset value upon initialization of the hard disk drive as shown in FIG. 2.
Figure 4:
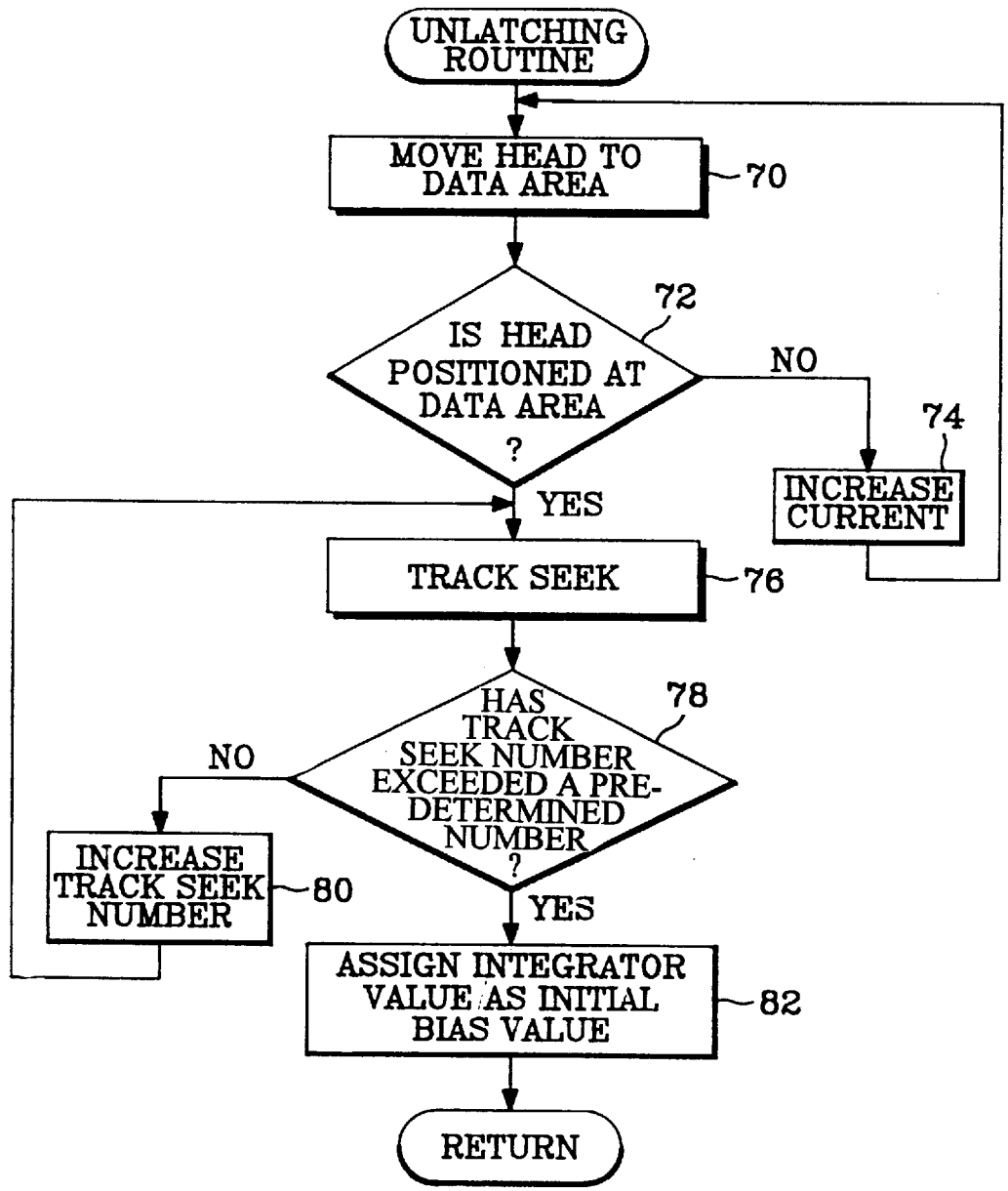
FIG. 4 is a flowchart showing the steps followed in the practice of the instant invention during unlatching of the head shown in FIG. 2.

FIG. 2 is a flowchart showing the steps of initializing the hard disk drive according to an embodiment of the present invention, FIG. 3 is a flowchart showing the steps of producing an integrated circuit offset value upon initialization of the hard disk drive as shown in FIG. 2, and FIG. 4 is a flowchart showing the steps of unlatching a head as shown in FIG. 2.

When the power is supplied to the hard disk drive, at step 40 of FIG. 2, the micro-controller 22 performs the overall initialization operation, e.g., variation initialization of the hard disk drive. The integrated circuit offset value produced on the printed circuit board is used in steps 42 to 48, more concretely, the unlatching step, first and second torque constants calibration step, and the bias calibration step. In the following description, the step of producing the integrated circuit offset value on the printed circuit board will be concretely described with reference to FIG. 3.

Initially, when the power of the hard disk drive is "on", at steps 50 and 52, the micro-controller 22 sets the initial offset value, a total offset value (hereinafter, referred to as T_offset), and an average offset value (hereinafter, referred to as A_offset) to "0", thereby outputting the control output value OUTPUT(U) equal to "0". The digital-to-analog converter 24 outputs the offset voltage of an analog format corresponding to the above control output value OUTPUT (U), namely "0" to the voice coil motor driving unit 26.

Voice coil motor driving unit 26 receives the input of the offset voltage in an analog format from digital-to-analog converter 24 and outputs the offset voltage as a positive current or voltage value corresponding to the offset value through an internal circuit. Analog-to-digital converter 20 converts the offset voltage value outputted from the voice coil motor driving unit 26 into digital data and feeds back the converted data to micro-controller 22. Micro-controller 22 checks, at step 54, whether or not the offset values of the integrated circuit of the printed circuit board, such as digital-to-analog converter 24, voice coil motor driving unit 26, and analog-to-digital converter 20 have been input. Accordingly, when it has been determined that the offset values of the integrated circuit of the printed circuit board, digital-to-analog converter 24, voice coil motor driving unit 26, and analog-to-digital converter 20 were input, micro-controller 22 proceeds to step 56.

At step 56, micro-controller 22 adds the T_offset set at step 50 to the offset value inputted at step 54 and newly, sets the added offset value as the T_offset, thereby proceeding to step 58. Micro-controller 22 checks at step 58, whether or not the above steps 52 and 56 have been repeatedly operated to a limited number set to calibrate the offset value of integrated circuit of the printed circuit board. In the case that the above steps 52 and 56 have been repeatedly operated to the limited number set to calibrate the offset value of integrated circuit of the printed circuit board, the micro-controller 22 proceeds to step 60, dividing the calibrated T_offset by the set limited number and producing the average offset value, i.e., A_offset. Thereafter, at step 62, the micro-controller 22 includes the produced average offset value A_offset in the control output value OUTPUT(U) until the hard disk drive is ready upon controlling the initial control loop, to thereby proceed to return to the aforesaid step 42 of FIG. 2. That is to say, the control output value OUTPUT(U) is set to OUTPUT(U)–A_offset.

At step 42, in order to move the head 12 positioned at the parking area to the data area, the micro-controller 22 outputs the control output value OUTPUT(U) produced at step 62 to the DAC 24 and performs the unlatching operation, thereby proceeding to step 44.

In term of performing unlatching operation with reference to FIG. 4, the control output value OUTPUT(U) outputted from the micro-controller 22 through the data bus is converted through the digital-to-analog converter 24 into analog data at step 70, the converted output value being supplied to voice coil motor driving unit 26. Since the output of voice coil motor driving unit 26 is supplied to voice coil motor 28 used as the actuator, micro-controller 22 moves head 12 into the specific cylinder (that is, the specific data area), and the process proceeds to step 72. At step 72, micro-controller 22 checks whether or not head 12 is positioned at the specific data area of the magnetic head 12. As a result of the above checking, if head 12 is not positioned at the specific data area, the micro-controller 22 outputs the control output value OUTPUT(U)+B to the digital-to-analog converter 24 at step 74, and then returns to step 70. B is the increment of current supplied to the voice coil motor 28 of the actuator. Alternatively, that is, arbitrarily generates the track seek error, at step 72, if the head 12 is positioned at the specific data area, the micro-controller 22 performs the track seek for the given time at step 76, and then proceeds to step 78. At this time, the micro-controller 22 arbitrarily leads to generate the track seek error in the course of performing the track seek routine, retries the track seek, and limits the number of retries of the track seek to a predetermined number.

The micro-controller 22 checks, at step 78, whether or not the retry number of the track seek has exceeded the predetermined number. If the retry number of the track seek has not exceeded to the predetermined number, the micro-controller 22 proceeds to step 80, so that the number of the track seek can be increased and then proceeds to step 76, thereby retrying the track seek, again. To the contrary, at step 78, if the retry number of the track seek has exceeded the predetermined number, the micro-controller 22 proceeds to step 82. Therein, micro-controller 22 assigns the integrator value calibrated upon the track seek as the bias value for initial track seek and track following operations upon performing the bias calibration, thereby returning to the initialization routine of FIG. 2.

After the unlatching routine step, the micro-controller 22 proceeds to step 44 of FIG. 2, thereby calibrating the first torque constant Kt. In this point, the track seek error is leaded with the same manner as the track seek operation which uses the first torque constant Kt preset upon the variable initialization at step 40 of FIG. 2, upon unlatching of FIG. 4, so that the initially set torque constant Kt can be compensated. Accordingly, because the above value is used upon calibration of the next bias, the oscillation phenomenon generated due to the offset value upon setting the torque constant Kt set initially in another HDA can be compensated, to thereby obtain a more exact bias value. Sequentially, the micro-controller 22 calibrates the bias at step 46. The above bias calibration is performed with the integrated circuit offset value of the printed circuit board stated in the description of FIG. 3, the bias value produced upon the unlatching, and the torque constant Kt obtained upon calibration of the first torque constant. In the meanwhile, the micro-controller 22 calibrates the second torque Kt at step 48. After determining a final torque constant Kt by using the second torque constant Kt obtained until calibrating the bias at step 46 or by using the bias value, it proceeds to a drive ready state. Ultimately, it is preferable to use the methods such as printed circuit board offset value calibration step, the unlatching step, and the torque constant calibration step, for the sake of minimizing the unstable factors according to offset value for each drive in relation with the initially set variations.

As apparent from the foregoing, the present invention is advantageously provided with an Hard disk drive initialization technique, for compensating for the offset value generated in associated circuits or apparatus, thereby stably initializing the head.

While there have been illustrated and described what are considered to be preferred embodiments of the present invention, it will be understood by those skilled in the art that various changes and modifications and equivalents may be substituted for elements thereof without departing from the true scope of the present invention. Therefore, it is intended that the present invention not be limited to the particular embodiments disclosed as the best mode contemplated for carrying out the present invention, but that the present invention includes all embodiments falling within the scope of the appended claims.

What is claimed is:

1. An hard disk drive initialization method, comprising the steps of:

(a) calibrating an initial offset value to calibrate an integrated circuit offset value of a printed circuit board upon the power being applied;

(b) unlatching a head by using said offset value produced in step (a);

(c) performing a track seek for a given time after step (b) and calibrating a first torque constant as a self diagnosis function of an actuator;

(d) calibrating a bias value from servo information detected during said track seek; and (e) performing said track seek after calibration of said bias value and calibrating a second final torque constant so as to calibrate said torque constant of said actuator.

2. The hard disk drive initialization method as defined in claim 1, said step (a) comprising:

(f) setting an offset value, a total offset value, and an average offset value to an initial variable, "0" in order to calibrate said integrated circuit offset value of said printed circuit board upon the power being applied;

(g) outputting said offset value set as said initial variable, "0" and producing an integrated circuit total offset value of said printed circuit board;

(h) repeatedly performing step (g) for a predetermined number of times, producing an integrated circuit average offset value of said printed circuit board; and (i) subtracting said integrated circuit average offset value of said printed circuit board from a control output value outputted upon unlatching said head and finally outputting said subtracted value.

3. The hard disk drive initialization method as defined in claim 2, said integrated circuit of said printed circuit board performing the steps of:

converting a digital servo control output value outputted from a controller of a drive into analog data in a first data converter;

driving a voice coil motor of said drive with a voice coil motor drive by way of said analog data outputted from said first data converter; and converting a current level in an analog format outputted from said voice coil motor driver into said digital data in a second data converter so as to control the driving of said voice coil motor and outputting said converted data to said controller.

4. The hard disk drive initialization method as defined in claim 2, said step (b) comprising:

performing a track seek for a given time period after moving said head from a parking area to a data area; and arbitrarily generating a track seek error during said track seek, retrying said track seek, and using an integrator value detected upon said track seek as an initial bias value when the retry number of said track seek has exceeded said predetermined number of times.

5. An hard disk drive initialization circuit, comprising:

calibrating means for calibrating an initial offset value to calibrate an integrated circuit offset value of a printed circuit board upon the power being applied;

unlatching means for unlatching a head by using said offset value produced by said calibrating means;

means for performing a track seek for a given time after said head is unlatched and for calibrating a first torque constant as a self diagnosis function of an actuator;

bias calibrating means for bias calibrating a bias value from servo information detected during said track seek; and said means for performing said track seek again performing said track seek after calibration of said bias value and calibrating a second final torque constant so as to calibrate said torque constant of said actuator.

6. The apparatus of claim 5, with said calibrating means comprising:

means for setting an offset value, a total offset value, and an average offset value to an initial variable, "0" in order to calibrate said integrated circuit offset value of said printed circuit board upon the power being applied;

means for outputting said offset value set as said initial variable, "0" and producing an integrated circuit total offset value of said printed circuit board;

repeatedly outputting said offset value and producing an integrated circuit total offset value of said printed circuit board for a predetermined number of times, and producing an integrated circuit average offset value of said printed circuit board in an average offset value producing means; and subtracting means for subtracting said integrated circuit average offset value of said printed circuit board from a control output value outputted upon unlatching said head and finally outputting said subtracted value.

7. The apparatus of claim 5, with said integrated circuit of said printed circuit board comprising:

first data converter for converting a digital servo control output value outputted from a controller of a drive into analog data;

voice coil motor driver for driving a voice coil motor of said drive by way of said analog data outputted from said first data converter; and second data converter for converting a current level in an analog format outputted from said voice coil motor driver into said digital data so as to control the driving of said voice coil motor and outputting said converted data to said controller.

8. The apparatus of claim 7, with said unlatching means comprising:

means for performing a track seek for a given time period after moving said head from a parking area to a data area; and means for arbitrarily generating a track seek error during said track seek, retrying said track seek, and using an integrator value detected upon said track seek as an initial bias value when the retry number of said track seek has exceeded said predetermined number of time.

9. A process for initialization a hard disk drive, comprising:

calibrating an initial offset value to establish an integrated circuit offset value for a printed circuit board upon application of electrical power to the printed circuit board;

unlatching a head positioned to read data from and write data onto a moving media held by a memory in dependence upon said offset value;

after unlatching the head, performing a track search for data stored upon said media for a given time after unlatching the head;

establishing a first torque constant as a self diagnosis function for an actuator supporting the head;

establishing a bias value in dependence upon servo information detected during said track search;

continuing said track search after establishing said bias value; and establishing a second torque constant in dependence said servo information detected while continuing said track search on a basis of torque demonstrated by said actuator.

* * * * *